J. Snyder.
Grinding-Mill.
N° 74161  Patented Feb. 4, 1868.
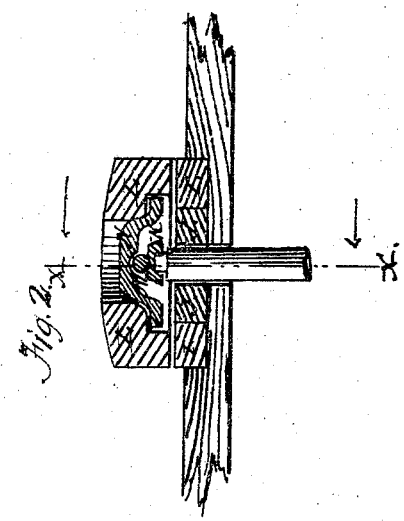
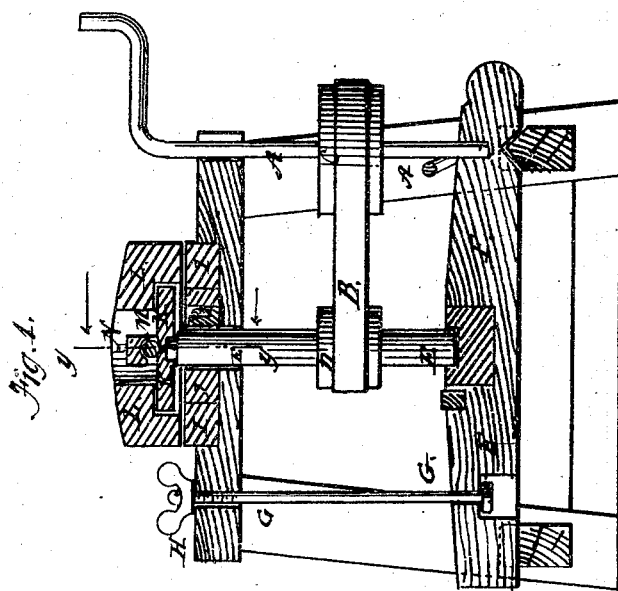
Attest:
Theo Tusche
W. Trewin
Inventor:
Jno Snyder
Per Munn & Co
Attorneys

United States Patent Office.

JOHN SNYDER, OF HART'S MILLS, INDIANA.

Letters Patent No. 74,161, dated February 4, 1868.

IMPROVEMENT IN GRINDING-MILLS.

*The Schedule referred to in these Letters Patent and making part of the same.*

TO ALL WHOM IT MAY CONCERN:

Be it known that I, JOHN SNYDER, of Hart's Mills, in the county of Ripley, and State of Indiana, have invented a new and useful Improvement in Grinding-Mills; and I do hereby declare that the following is a full, clear, and exact description thereof, which will enable others skilled in the art to make and use the same, reference being had to the accompanying drawings, forming part of this specification, in which—

Figure 1 is a vertical section of my improved mill, taken through the line $x\, x$, fig. 2.

Figure 2 is a detail sectional view of the same, taken through the line $y\, y$, fig. 1.

Similar letters of reference indicate corresponding parts.

My invention has for its object to furnish an improved manner of hanging the upper millstone or runner, so as to insure freedom of motion, and the proper and effective action of the runner and spindle, and at the same time to facilitate the tramming of the spindle; and it consists in the manner in which the upper stone or runner is hung, and in the combination of an oil-cup with the bush of the lower or stationary stone; the whole being constructed and arranged as hereinafter more fully described.

A represents the drive-shaft. B is a band passing around the pulley C, attached to the drive-shaft A, and around the pulley D, attached to the vertical shaft or spindle E, that carries and drives the upper stone or runner. The lower end of the spindle E works in a socket in the beam F, one end of which rests upon a wedge-shaped support, so that the said spindle may be trammed by raising or lowering the other end of said beam F. G is a rod, the lower end of which is secured to the end of the beam F, and the other or upper end of which passes up through the framework that surrounds the millstones, and has a screw-thread cut upon it for the reception of the hand-nut H, so that the spindle E may be trammed by operating the said hand-nut. I is the lower or stationary stone, which is secured and encased in the ordinary manner. J is the bush in the stone I, in which the spindle E works. The upper end of the spindle E projects about two inches above the lower or stationary stone I, and has a square tenon formed upon its upper end, which enters a square mortise formed in the lower side of the drive-bar K, the ends of which enter recesses formed for their reception in the upper stone or runner L. In the upper side of the drive-bar K is formed a concave recess or socket, in which rests a ball or globe, M. N is the supporting-bar, in the under side of which is formed a concave recess or socket, fitting upon the upper side of the globe or ball M. The bar N is placed at right angles to the bar K, is made in about the shape shown in fig. 2, and its ends rest in recesses formed for their reception in the runner L, so that the upper stone L is supported upon the ball M, and is driven by the bar K, thus preventing all rocking motion of the runner, equalizing the bearing of the driver, preventing the tipping of the stone, insuring freedom of motion, and preventing heating in grinding. O is an oil-cup or reservoir formed in the bush J, from which a wick or other suitable conductor conducts the oil to the spindle E as it is required. The oil-reservoir O contains oil enough to last from one dressing of the millstones to another, and being so near the spindle, is always kept warm, so as to always furnish such a supply of oil as may be necessary.

I claim as new, and desire to secure by Letters Patent—

The combination and arrangement of the drive-bar K, ball or globe M, and supporting-bar N, with each other, with the upper end of the spindle E, and with the upper stone or runner L, substantially as herein shown and described, and for the purpose set forth.

JOHN SNYDER.

Witnesses:
THOMAS J. LORD,
WILLIAM L. CONNELL.